June 10, 1941.　　　P. PRINGIERS　　　2,245,498
ROTARY ENGINE
Filed Aug. 23, 1938　　　3 Sheets-Sheet 1
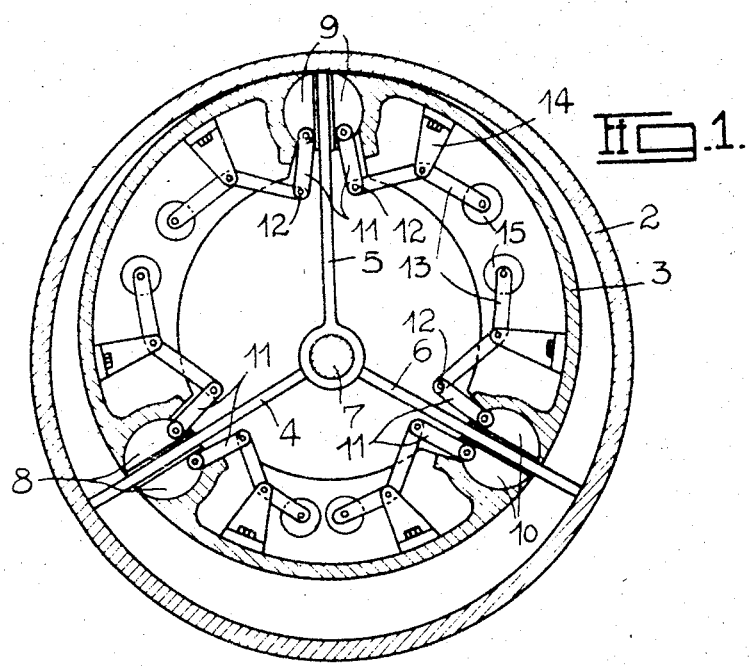
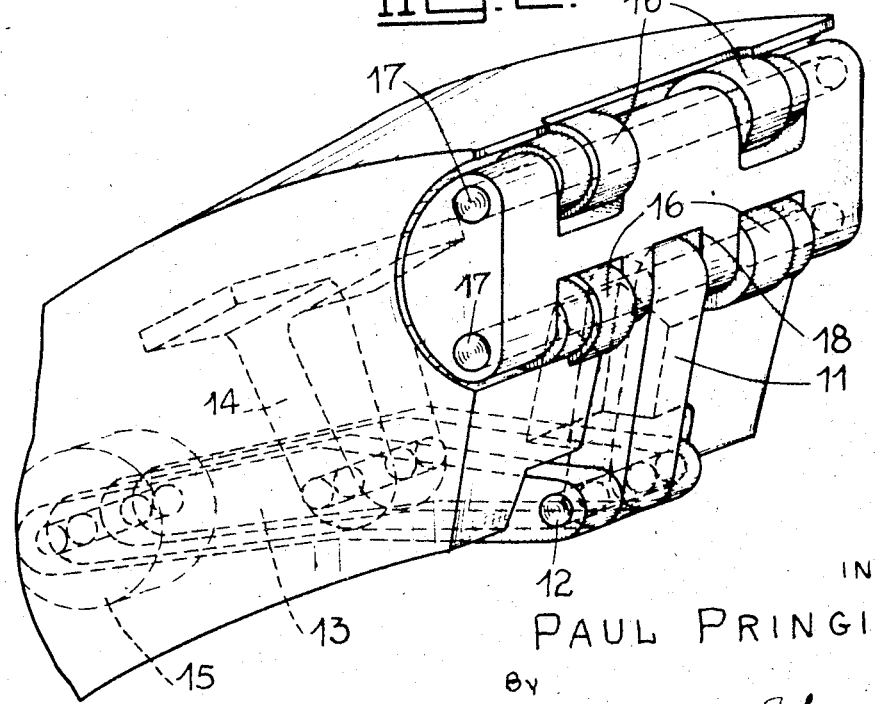
INVENTOR
PAUL PRINGIERS
BY
Young, Emery & Thompson
ATTYS.

June 10, 1941.   P. PRINGIERS   2,245,498
ROTARY ENGINE
Filed Aug. 23, 1938   3 Sheets-Sheet 2
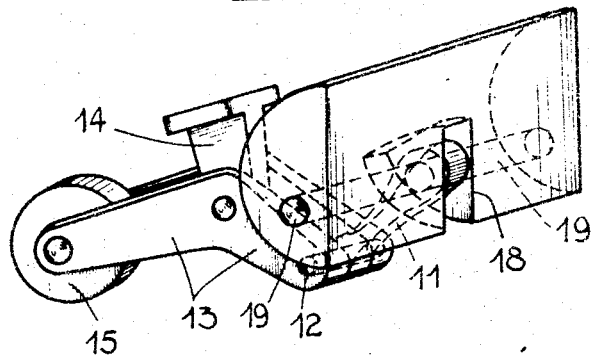
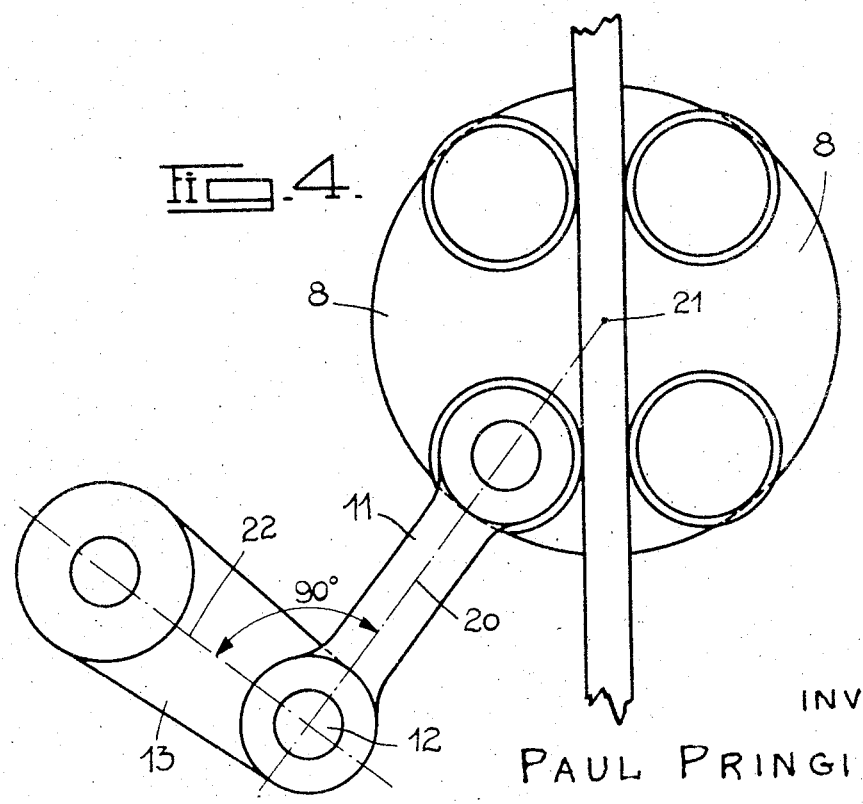
INVENTOR
PAUL PRINGIERS
By Young, Emery + Thompson
ATTYS.

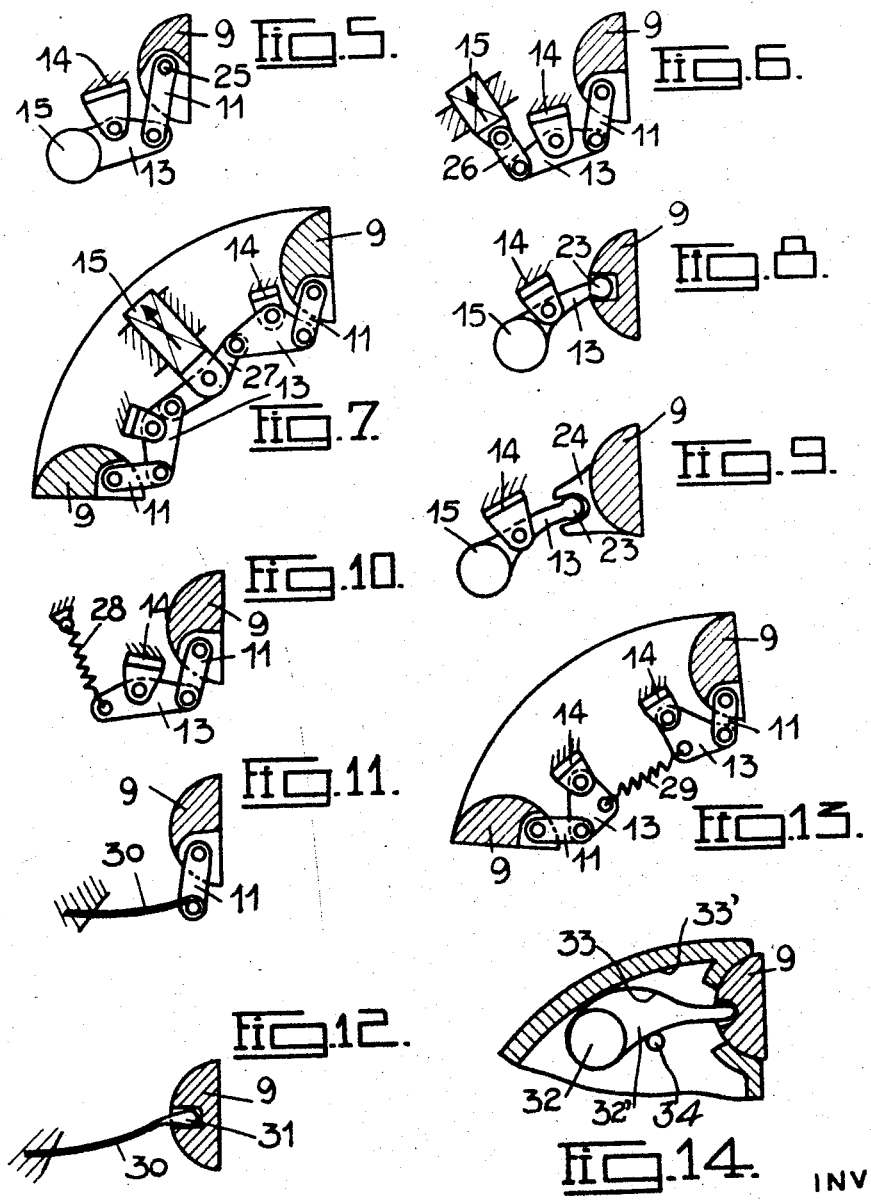

Patented June 10, 1941

2,245,498

UNITED STATES PATENT OFFICE 2,245,498

ROTARY ENGINE

Paul Pringiers, La Louviere, Belgium, assignor to Baume & Marpent S. A., a joint-stock company of Belgium Application August 23, 1938, Serial No. 226,348
In Belgium September 9, 1937

9 Claims. (Cl. 103—144)

The present invention relates to rotary engines which may be either prime movers or driven machines, comprising in a cylindrical stator, an eccentric rotor provided with vanes extending through the wall of the rotor in bearings in which they reciprocate.

The invention relates more particularly to engines of the kind above stated in which the vanes are mounted radially on a shaft concentric with the stator and slide in oscillating bearings each formed of two half-bearings in the form of segments of the same cylinder.

In engines of this kind, the effects of the centrifugal force acting on the bearings make it necessary to reduce the admissible speeds for satisfactory operation from the industrial point of view.

Furthermore, at high speeds, the centrifugal force tends to jam the vanes and the half-bearings in the recesses of the rotor in which the bearings oscillate, so that the bearings and the vanes are subjected to excessive strains.

With a view to remedying these disadvantages and to permit the speed of rotation of these engines to be considerably increased, provision is made according to the present invention for connecting the bearings to a counterpoise on which the centrifugal force acts in opposition to the centrifugal force acting on the bearings, while permitting the latter to oscillate in their recesses in the rotor.

According to the preferred construction of the invention, provision is made to connect each bearing through the medium of a link to one end of a rocking lever supported on the rotor and comprising at its other end a counterpoise, in such a manner that the centrifugal force acting on the bearing is compensated partly or entirely or in excess by the centrifugal force acting on the counterpoise, the link connection permitting the oscillations of the bearings in their recesses.

Other details and features of the invention will appear from the following description and accompanying drawings which are given by way of example.

Figure 1 represents diagrammatically a rotary engine of the kind described.

Figures 2 and 3 represent on a larger scale and in perspective two constructions of the invention.

Figure 4 illustrates diagrammatically a feature of the invention.

Fig. 5 is a somewhat diagrammatic sectional view of the half bearing and associated mechanism showing a modified structure.

Fig. 6 is a similar view showing another modification.

Fig. 7 is a similar view showing a further modification.

Fig. 8 is a similar view showing still another modified form of structure.

Fig. 9 is another view like Fig. 5, showing yet another modification.

Fig. 10 is a further view like Fig. 5 showing another form of structure.

Fig. 11 is still another view like Fig. 5 showing a further modified form of structure.

Fig. 12 is yet another view like Fig. 5 showing a different construction.

Fig. 13 is a similar view showing a modification of the structure of Fig. 10.

Fig. 14 is another view like Fig. 5 showing a further modified structure.

The same parts are denoted by the same reference numerals in the various figures.

Figure 1 shows diagrammatically a rotary engine comprising in a cylindrical stator 2 a rotor 3 likewise cylindrical but eccentric relatively to the stator and provided with three vanes 4, 5 and 6 mounted radially on a shaft 7 concentric with the stator.

The vanes 4, 5 and 6, slide in bearings 8, 9 and 10, each formed of two half-bearings in the form of segments of the same cylinder, and these bearings are adapted to oscillate in cylindrical recesses of corresponding form provided in the rotor 3.

Each half-bearing is connected by a link 11 to one end 12 of the rocking lever or bell-crank lever 13 mounted by means of a pivot on a support 14 fixed to the rotor 3. The other end of the rocking lever 13 comprises a counterpoise 15. The length of the two arms of the rocking lever and the counterpoise 15 may be designed so as to compensate either partly, totally or with excess the centrifugal force acting on the half-bearings.

In engines of the kind described, the surfaces of the half-bearings in sliding contact with the faces of the vanes may be smooth.

It is likewise known to provide these faces of the bearings with rollers journalled on spindles mounted in the half-bearings.

Figure 2 shows in perspective a half-bearing comprising four rollers 16 mounted in pairs on spindles 17. In the case of such a bearing, the link 11 is connected to the bearing by means of the lower spindle 17, a slot 18 being provided for this purpose in the half-bearing.

In the case of a half-bearing having a smooth surface, that is to say without anti-friction rollers, a slot 18 is provided as shown in Figure 3 and the link 11 is connected to the half-bearing by a pin 19 extending across said slot.

According to a feature of the invention, for practically eliminating the oscillations of the rocking lever and counterpoise, provision is made as shown in Figure 4 so that in the mean position of the bearing and link, the axis 20 of the link passes through the virtual centre of rotation 21 of the bearing 9 composed of two half-bearings, while the axis 22 of the arm of the rocking lever 13 connected to the link 11 is perpendicular to the axis 20 of the latter.

In Figure 5, balancing is provided by means of a link 11 as in Figure 1 but said link 11 is fixed at 25 at the centre of gravity of the bearing 9 instead of being fixed to the bottom of said bearing, so as to balance the centrifugal force without secondary couples.

Figure 6 again shows a construction of balancing by means of a counterpoise 15, but the latter instead of being fixed to the lever 13 slides rectilinearly in a recess of the rotor and is connected to the lever 13 by a second link 26.

Figure 7 shows another construction of balancing by counterpoise in which the same counterpoise 15 serves for two adjacent bearings 9. The supplementary link 26 of Figure 6 is here replaced by a central rocking lever 27. The end joints of this lever have a slight play necessary for the relative movements of the various elements. This device has the particular advantage of eliminating some of the movements of the counterpoise owing to the differential effect of the associated movements of the two bearings.

According to the construction shown in Figure 8, balancing is effected by counterpoise but the link 11 of Figure 1 has been omitted and the rocking lever 17 with the counterpoise 15 has a cylindrical or spherical head 23 engaging a cavity in the bearing 9 which is thus retained against its own centrifugal force.

Figure 9 shows a construction analogous to that of Figure 8, but instead of engaging the body of the bearing 9 itself, the lever 13 retains the bearing, by means of a cylindrical head 23 engaging a fork 24 secured to the bearing and extending into a recess in the rotor 3 (Figure 1).

Figure 10 shows a construction of the balancing of the bearings by spring in place of the balancing by counterpoise.

This construction comprises a lever 13 and a link 11 the centrifugal pull of the counterpoise being replaced by the return spring 28 of high flexibility tensioned to the desired degree for balancing the centrifugal force of the bearing when the engine is running at its working speed.

This system having one or more springs is applicable to engines running continuously at a constant speed. It has the advantage of a low inertia to the oscillations of the bearings.

Figure 11 shows a construction analogous to that of Figure 10 but in this case the lever 13 and the spring 28 are replaced by a single blade spring of high flexibility tensioned to the desired degree.

Figure 12 shows another construction employing a single blade spring 30 as in the case of Figure 11, but this spring terminates in a rounded head 31 engaging a cavity in the body of the bearing 9 as in the case of Figure 8.

Figure 13 shows a method of balancing by spring with a differential effect, analogous to that of Figure 7, but the reaction of the counterpoise 15 is replaced by that of a spring 29 of high flexibility tensioned to the desired degree.

In Figure 14, the centrifugal force of the bearing 9, is counterbalanced by a counterpoise 32 having an automatically variable action, ensuring an accentuated return when the bearing departs further from the centre of the engine, and reducing the return when the bearing approaches this centre. For this purpose, the rocking lever $32'$ is supported on the rotor through the medium of a curved surface 33 adapted to roll on the rolling surface $33'$ of the rotor. The abutment pin 34 limits movement of the lever $32^1$ away from the surface $33^1$.

As will be readily understood, by means of the device described and shown, it is possible to compensate the effects of the centrifugal force acting on the bearings, while permitting their oscillation, thereby enabling the bearing to resist normally the stress for which it is designed, that is to say, the stresses perpendicular to the vanes.

The possibility of considerably increasing the speed of rotation of engines of this kind likewise results therefrom. The invention is applicable to any rotary engines of the kind described.

What I claim is:

1. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, and means carried by the rotor for compensating the action of centrifugal force on said bearings.

2. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, and a counterweight for compensating the action of centrifugal force on said bearings.

3. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, means carried by the rotor for compensating the action of centrifugal force on said bearings, and means connecting the centrifugal force compensating means to said bearings for transmitting compensating force while permitting the bearings to oscillate.

4. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, a rocking lever carried by the rotor, a link connecting one end of the lever to said bearings, and means acting on the other end of the lever for compensating the action of centrifugal force on said bearings.

5. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, a rocking lever carried by the rotor, a link connecting one end of the lever to said bearings, and counterweight means acting on the other end of the lever for compensating the action of centrifugal force on said bearings.

6. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, a rocking lever carried by the rotor, a link connecting one end of the lever to said bearings, counterweight means acting on the other end of the lever for compensating the action of centrifugal force on said bearings, and means on said rotor for guiding said counterweight in a rectilinear path.

7. A rotary engine comprising a cylindrical stator having a fluid working chamber therein, a rotor eccentrically mounted in said stator chamber, said rotor having radial openings therein, a shaft concentric with the stator and extending axially through the rotor, vanes mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, a rocking lever carried by the rotor, a link connecting one end of the lever to said bearings, counterweight means acting on the other end of the lever for compensating the action of centrifugal force on said bearings, said rotor having a slot therein for sliding movement of the counterweight to guide said weight in a rectilinear path, and a second link connecting the counterweight to the lever.

8. A rotary engine comprising a cylindrical stator having a fluid working chamber therein, a rotor eccentrically mounted in said stator chamber, said rotor having radial openings therein, a shaft concentric with the stator and extending axially through the rotor openings, vanes mounted on said shaft and extending substantially radially through the rotor, the radial openings of the rotor having axially extending cylindrical recesses therein, bearings in the form of segments of a cylinder mounted in said recesses on opposite sides of the vanes for oscillation, fluid inlet and outlet ports for said chamber, a rocking lever carried by the rotor, a link connecting one end of the lever to said bearings, and counterweight means acting on the other end of the lever for compensating the action of centrifugal force on said bearings, said rotor having a curved inner supporting surface and said rocking lever having a convex curved surface adapted to roll on said supporting surface of the rotor.

9. A rotary engine comprising a cylindrical stator having a fluid working chamber therein, a rotor eccentrically mounted in said stator chamber, said rotor having radial openings therein, a shaft concentric with the stator vanes rotatably mounted on said shaft and extending substantially radially through the rotor openings, the radial openings of the rotor having axially extending cylindrical recesses therein, bearings in the form of segments of a cylinder mounted in said recesses on opposite sides of the vanes for oscillation, fluid inlet and outlet ports for said chamber, a counterweight slidably and rectilinearly mounted in a recess in said rotor, a central rocking lever pivotally connected to said counterweight, and a lateral rocking lever on each side of said central rocking lever and pivotally connected thereto, each of said lateral rocking levers being also pivotally connected to one of two of the adjacent bearings, said counterweight acting to compensate the centrifugal force acting on said adjacent bearings.

PAUL PRINGIERS.